INVENTOR.
KENNETH A. WILSON
BY
Barnes Kisselle Raisch & Choate
ATTORNEYS

Feb. 17, 1970 K. A. WILSON 3,495,677

GUIDANCE SYSTEM

Filed Jan. 31, 1968 14 Sheets-Sheet 2

INVENTOR.
KENNETH A. WILSON

BY

Barnes, Kisselle, Raisch & Choate

ATTORNEYS

Feb. 17, 1970 K. A. WILSON 3,495,677

GUIDANCE SYSTEM

Filed Jan. 31, 1968 14 Sheets-Sheet 3

INVENTOR.
KENNETH A. WILSON
BY
Barnes, Kisselle, Raisch & Choate
ATTORNEYS

| 8 | 7 | 6 | 5 | STATION TENS DIGIT | NODES TENS DIGIT | SPECIAL CODES |
|---|---|---|---|---|---|---|
| 0 | 0 | 0 | 0 | | | A |
| 0 | 0 | 0 | 1 | | 0 | |
| 0 | 0 | 1 | 0 | | 1 | |
| 0 | 0 | 1 | 1 | | 2 | |
| 0 | 1 | 0 | 0 | 0 | | |
| 0 | 1 | 0 | 1 | 1 | | |
| 0 | 1 | 1 | 0 | 2 | | |
| 0 | 1 | 1 | 1 | 3 | | |
| 1 | 0 | 0 | 0 | 4 | | |
| 1 | 0 | 0 | 1 | 5 | | |
| 1 | 0 | 1 | 0 | 6 | | |
| 1 | 0 | 1 | 1 | 7 | | |
| 1 | 1 | 0 | 0 | 8 | | |
| 1 | 1 | 0 | 1 | 9 | | |
| 1 | 1 | 1 | 0 | | | B |
| 1 | 1 | 1 | 1 | | | C |

| 4 | 3 | 2 | 1 | UNITS DIGIT | SPECIAL CODES |
|---|---|---|---|---|---|
| 0 | 0 | 0 | 0 | | D |
| 0 | 0 | 0 | 1 | | E |
| 0 | 0 | 1 | 0 | | F |
| 0 | 0 | 1 | 1 | | G |
| 0 | 1 | 0 | 0 | 0 | |
| 0 | 1 | 0 | 1 | 1 | |
| 0 | 1 | 1 | 0 | 2 | |
| 0 | 1 | 1 | 1 | 3 | |
| 1 | 0 | 0 | 0 | 4 | |
| 1 | 0 | 0 | 1 | 5 | |
| 1 | 0 | 1 | 0 | 6 | |
| 1 | 0 | 1 | 1 | 7 | |
| 1 | 1 | 0 | 0 | 8 | |
| 1 | 1 | 0 | 1 | 9 | |
| 1 | 1 | 1 | 0 | | H |
| 1 | 1 | 1 | 1 | | J |

INVENTOR.
KENNETH A. WILSON
BY
Barnes, Kisselle, Raisch & Choate
ATTORNEYS

INVENTOR.
KENNETH A. WILSON
BY
Barnes, Kisselle, Raisch & Choate
ATTORNEYS

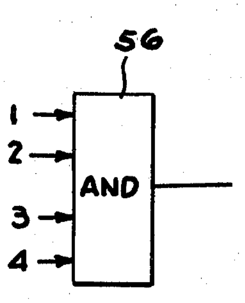
FIG. 12
FIG. 13
| | 4 | 3 | 2 | 1 |
|---|---|---|---|---|
| * | M4 | M3 | M2 | M1 |
| 0 | 0 | 1 | 0 | 0 |
| 1 | 0 | 1 | 0 | 1 |
| 2 | 0 | 1 | 1 | 0 |
| 3 | 0 | 1 | 1 | 1 |
| 4 | 0 | 1 | 1 | 1 |
| 5 | 1 | 0 | 0 | 1 |
| 6 | 1 | 0 | 1 | 0 |
| 7 | 1 | 0 | 1 | 1 |
| 8 | 1 | 1 | 0 | 0 |
| 9 | 1 | 1 | 0 | 1 |
* STATION UNITS DIGIT OR DECISION POINTS UNITS DIGIT
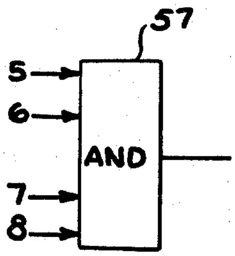
FIG. 14
FIG. 15
58
| e | 8 | 7 | 6 | 5 |
|---|---|---|---|---|
| * | M8 | M7 | M6 | M5 |
| 0 | 0 | 1 | 0 | 0 |
| 1 | 0 | 1 | 0 | 1 |
| 2 | 0 | 1 | 1 | 0 |
| 3 | 0 | 1 | 1 | 1 |
| 4 | 1 | 0 | 0 | 0 |
| 5 | 1 | 0 | 0 | 1 |
| 6 | 1 | 0 | 1 | 0 |
| 7 | 1 | 0 | 1 | 1 |
| 8 | 1 | 1 | 0 | 0 |
| 9 | 1 | 1 | 0 | 1 |
* STATIONS TENS DIGIT
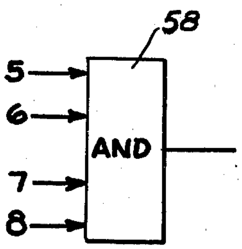
FIG. 16
FIG. 17
| | 8 | 7 | 6 | 5 |
|---|---|---|---|---|
| * | M8 | M7 | M6 | M5 |
| 0 | 0 | 0 | 0 | 1 |
| 1 | 0 | 0 | 1 | 0 |
| 2 | 0 | 0 | 1 | 1 |
* DECISION POINT TENS DIGIT
INVENTOR.
KENNETH A. WILSON
BY
Barnes, Kisselle, Raisch & Choate
ATTORNEYS INVENTOR.
KENNETH A. WILSON
BY
Barnes, Kisselle, Raisch & Choate
ATTORNEYS INVENTOR.
KENNETH A. WILSON
BY
Barnes, Kisselle, Raisch & Choate
ATTORNEYS INVENTOR.
KENNETH A. WILSON
BY
Barnes, Kisselle, Raisch & Choate
ATTORNEYS INVENTOR.
KENNETH A. WILSON
BY
Barnes, Kisselle, Raisch & Choate
ATTORNEYS

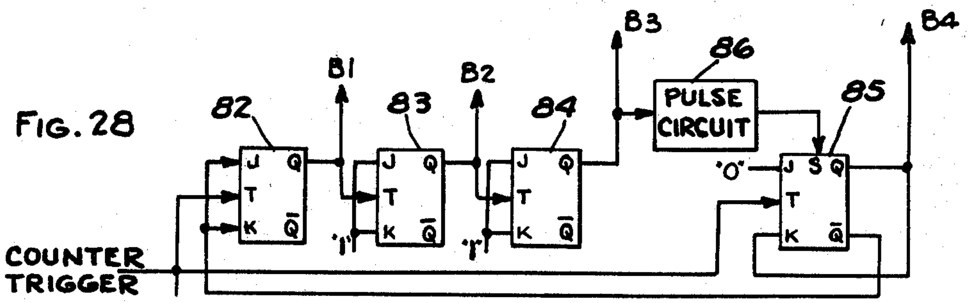
FIG. 28
6
| | B4 | B3 | B2 | B1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 0 | 0 | 0 | 0 |
FIG. 29
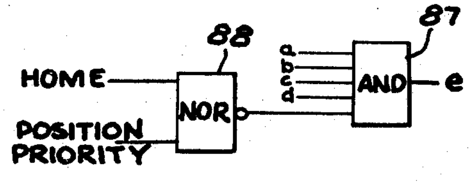
FIG. 30
| e | d | c | b | a |
|---|---|---|---|---|
| | B4 | B3 | B2 | B1 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
FIG. 31
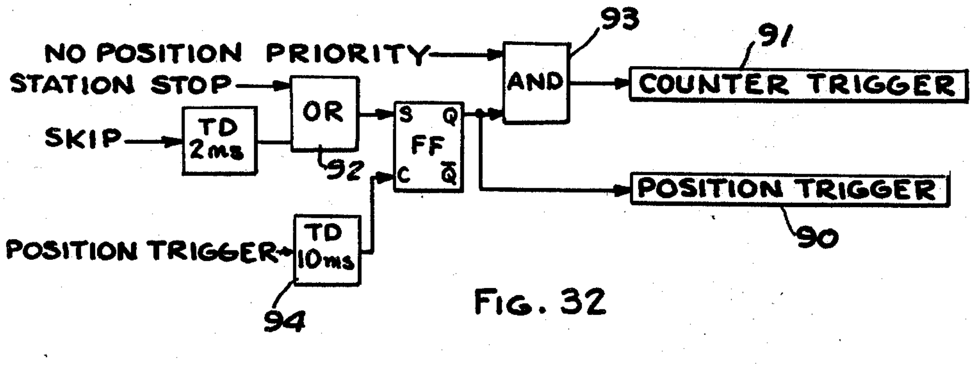
FIG. 32
INVENTOR.
KENNETH A. WILSON
BY
Barnes, Kisselle, Raisch & Choate
ATTORNEYS Feb. 17, 1970 K. A. WILSON 3,495,677

GUIDANCE SYSTEM

Filed Jan. 31, 1968 14 Sheets-Sheet 12

INVENTOR.
KENNETH A. WILSON

BY
Barnes, Kisselle, Raisch & Choate
ATTORNEYS

Feb. 17, 1970 K. A. WILSON 3,495,677

GUIDANCE SYSTEM

Filed Jan. 31, 1968 14 Sheets-Sheet 13

INVENTOR.
KENNETH A. WILSON

BY
Barnes, Kisselle, Raisch & Choate

ATTORNEYS

DC FLIP FLOP (FLIP FLOP LATCH)
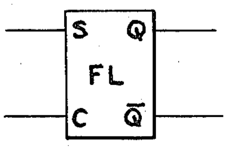
FIG. 38
| t=n | | t=n+1 | |
|---|---|---|---|
| S | C | Q | $\bar{Q}$ |
| 0 | 0 | $Q^n$ | $\bar{Q}^n$ |
| 0 | 1 | 0 | 1 |
| 1 | 0 | 1 | 0 |
| 1 | 1 | * | * |
FIG. 39
AC FLIP FLOP
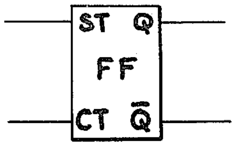
FIG. 40
| t=n | | t=n+1 | |
|---|---|---|---|
| ST | CT | Q | $\bar{Q}$ |
| 0 | 0 | $Q^n$ | $\bar{Q}^n$ |
| 0 | P | 0 | 1 |
| P | 0 | 1 | 0 |
| P | P | * | * |
FIG. 41
GATED AC FLIP FLOP
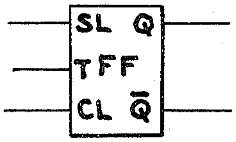
CLOCK INPUT TO T
FIG. 42
| t=n | | t=n+1 | |
|---|---|---|---|
| SL | CL | Q | $\bar{Q}$ |
| 0 | 0 | Q | $\bar{Q}^n$ |
| 0 | 1 | 0 | 1 |
| 1 | 0 | 1 | 0 |
| 1 | 1 | * | * |
FIG. 43
INVENTOR.
KENNETH A. WILSON
BY
Barnes, Kisselle, Raisch & Choate
ATTORNEYS United States Patent Office 3,495,677

Patented Feb. 17, 1970

3,495,677
GUIDANCE SYSTEM

Kenneth A. Wilson, Locust Valley, N.Y., assignor to American Chain & Cable Company, Inc., New York, N.Y., a corporation of New York Filed Jan. 31, 1968, Ser. No. 702,049
Int. Cl. B60k *27/00;* B62d *3/00;* B65g *1/00*
U.S. Cl. 180—98 35 Claims

ABSTRACT OF THE DISCLOSURE

The guidance system disclosed herein comprises a guide path which is defined by a conductor or wire embedded in the floor and defining the path to be followed by the vehicle. The conductor is energized by an appropriate energizer such as an oscillator. The vehicle includes sensor means which senses the position of the energized conductor and guides the vehicle along the path. The path contains various stations at which the vehicle is to stop and decision points, such as diverging points, at which portions of the conductor are brought into close proximity so that the vehicle must decide which path to follow. The vehicle also includes reader means which senses signal means at the stations and decision points along the guide path. Station selector means are provided on the vehicle. The reader means and signal means produce a binary signal which is converted to a decimal signal by a decoder and a station comparator compares the decimal signal with the signal from the station selector and stops the vehicle at the appropriate station. A decision point comparator is provided on the vehicle for determining a predetermined path for movement of the vehicle past the decision point to each station. The decision point comparator is operable upon signal from the decoder to produce a path control signal for controlling the path of the vehicle at any decision point. The decision point comparator comprises a plurality of matrix boards which receive signals from the decoder at the decision point and compare the signals with signals from the station selector means to produce an appropriate path control signal.

This invention relates to guidance systems and particularly to guidance systems for unmanned self-propelled vehicles or tractors.

BACKGROUND OF THE INVENTION

It has been well known that an unmanned self-propelled vehicle may be guided along a predetermined path defined by an energized conductor by sensing the position of the conductor and guiding the vehicle along the path defined by the conductor. It has also been well known that by complex wiring and multiple switches, including memory banks of switches, the movement of the vehicle to a predetermined station and the path control of the vehicle at decision points wherein diverse paths are provided can be controlled. More specifically, the control of the vehicle has been achieved in various ways such as providing diverse guide paths at two different frequencies at the decision points and causing a path control signal to control the vehicle sensor means at the decision points so that it is responsive only to one of the two frequencies. Another method of path control is to cause a path control signal to steer the vehicle in a predetermined path at a decision point. In still another method of path control, a path control signal selectively energizes different guide paths at a decision point to produce a single path along which the vehicle is to be guided.

Among the objects of this present invention are to provide a novel apparatus for producing a stop signal at a predetermined station and for producing a path control signal for guiding a vehicle past a particular decision point toward a predetermined station; which apparatus utilizes solid state electronics; which apparatus requires a minimum of maintenance; which can be readily adapted to various systems; wherein the principal portions of the system are mounted on the vehicle.

SUMMARY

The guidance system disclosed herein comprises a guide path which is defined by a conductor or wire embedded in the floor and defining the path to be followed by the vehicle. The conductor is energized by an appropriate energizer such as an oscillator. The vehicle includes sensor means which senses the position of the energized conductor and guides the vehicle along the path. The path contains various stations at which the vehicle is to stop and decision points such as diverging points at which portions of the conductor are brought into close proximity so that the vehicle must decide which path to follow. The vehicle also includes reader means which senses signal means at the stations and decision points along the guide path. Station selector means are provided on the vehicle. The reader means and signal means produce a binary signal which is converted to a decimal signal by a decoder and a station comparator compares the decimal signal with the signal from the station selector and stops the vehicle at the appropriate station. A decision point comparator is provided on the vehicle for determining a predetermined path for movement of the vehicle past the decision point to each station. The decision point comparator is operable upon signal from the decoder to produce a path control signal for controlling the path of the vehicle at any decision point. The decision point comparator comprises a plurality of matrix boards which receive signals from the decoder at the decision point and compare the signals with signals from the station selector means to produce an appropriate path control signal.

DESCRIPTION OF THE DRAWINGS

FIG. 12 is a schematic diagram of the units digit memory decoder.

FIG. 13 is a table showing the relationship of the pulses for the units digit memory decoder shown in FIG. 12.

FIG. 14 is a schematic diagram of the station tens digit memory decoder.

FIG. 15 is a table showing the relationship of the pulses for the station tens digit memory decoder shown in FIG. 14.

FIG. 16 is a schematic diagram of the decision point tens digit memory decoder.

FIG. 17 is a table showing the relationship of the pulses in the decoder shown in FIG. 16.

FIG. 28 is a schematic diagram of the position counter.

FIG. 29 is a table of the pulse relationships in the position counter shown in FIG. 28.

FIG. 30 is a schematic diagram of the position counter decoder.

FIG. 31 is a table of the pulse relationship in the position counter decoder shown in FIG. 30.

FIG. 32 is a schematic diagram of the trigger circuit.

FIG. 38 is a schematic of one type of flip-flop utilized in the system.

FIG. 39 is a table of the input and output of the flip-flop shown in FIG. 38.

FIG. 40 is a schematic of another flip-flop utilized in the system.

FIG. 41 is a table of the input and output of the flip-flop shown in FIG. 40.

FIG. 42 is a schematic of another flip-flop utilized in the system.

FIG. 43 is a table of the input and output of the flip-flop shown in FIG. 42.

GENERAL DESCRIPTION

Figure 1:
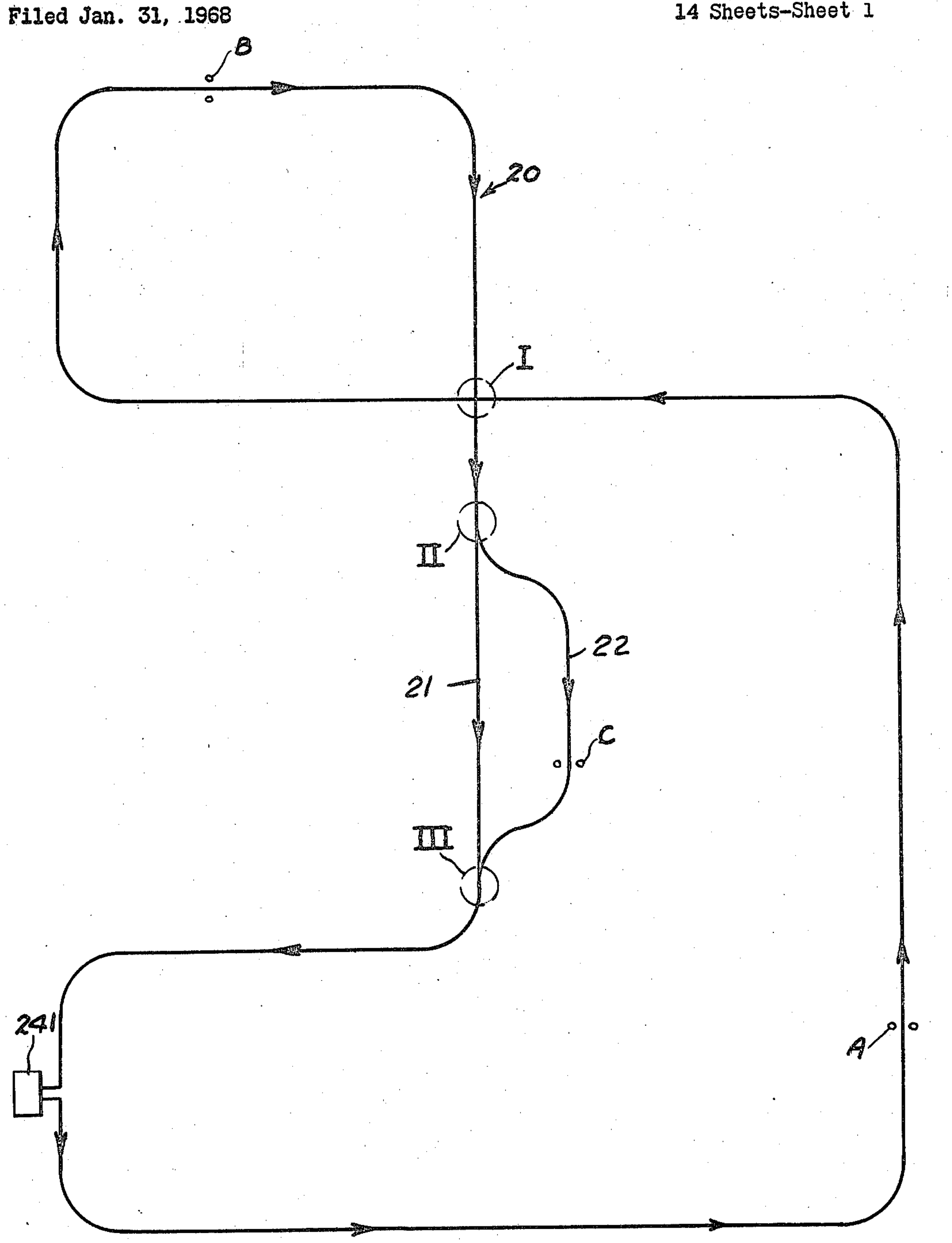
FIG. 1 is a schematic diagram of a typical guide path.

Referring to FIG. 1, the guide path 20 shown is utilized for controlling the movement of one or more vehicles such as tractors which may pull trailers between stations A, B and C. As shown, the guide path includes an intersection I, a diverging intersection II wherein the vehicle can move in one of two paths 21, 22, the latter extending to station C, and a converging intersection III.

The guide path 20 is defined by a single circuit comprising conductors or wires embedded in the floor and so connected that at all times a single circuit is defined. The conductor is energized by a constant current oscillator 24, for example, at a frequency of 2 kc. and ⅛ ampere.

Figure 2:
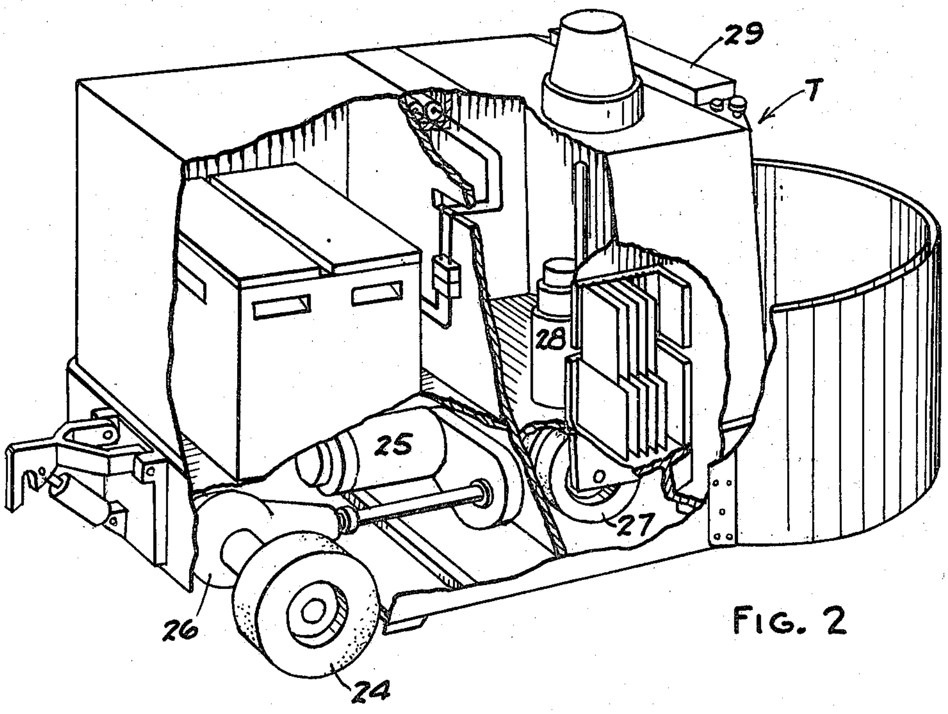
FIG. 2 is a fragmentary part sectional view of a typical self-propelled vehicle.

Referring to FIG. 2, the vehicle T which may comprise a tractor is provided with rear drive wheels 24 that are driven by a motor 25 through a differential 26 and a front dirigible style steering wheel 27 that is steered by a steering motor 28. A control system is provided on the vehicle which senses codes along the guide path and produces an appropriate path control signal for guiding the vehicle in a desired path, as more fully described hereinafter. The control system includes a control panel 29 into which the operator places or selects one or more positions or destinations to which the vehicle is to be guided.

Figure 3:
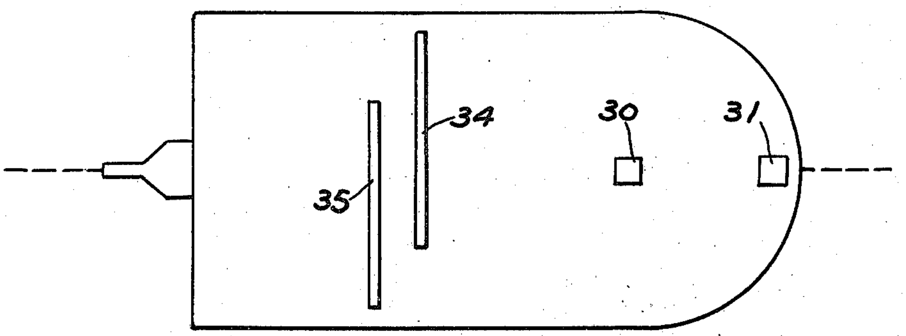
FIG. 3 is a diagrammatic bottom plan view of the vehicle.

Referring to FIG. 3, the vehicle includes sensor means 30 which are utilized to control the steering motor 28 and steer the vehicle along the energized guide path as described, for example, in the patent to Hosking et al. 3,039,954, issued June 19, 1962.

In addition, selectively energizable sensing means in the form of two bars 34, 35 supporting reader devices are provided for sensing or reading code signals placed in predetermined positions along the path of the vehicle. If the code signal being read is at a station, it is compared with an assigned station signal and the vehicle is stopped if they are identical. If the code signal being read is a decision point signal, it is compared with a predetermined program and the proper course of the vehicle is determined by producing an appropriate path control signal for guiding the vehicle. The path control signal may be utilized to control the steering of the vehicle, the tuning of a guide sensing means on the vehicle to a particular frequency for following a guide path energized at the desired frequency, or for selectively energizing a predetermined guide path along which the vehicle is to move toward the assigned station.

Figures 5, 6, 7:
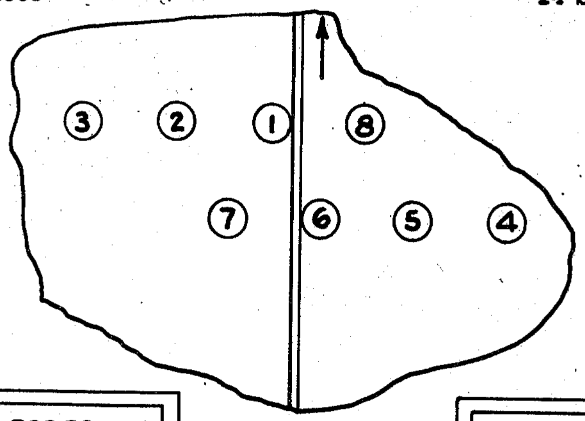
FIG. 5 is a plan view of an arrangement of signal stations along the path of the vehicle.
FIG. 6 is a table of the tens digit coding system utilized in the apparatus.
FIG. 7 is a table of the units digit coding system utilized in the apparatus.

Although only three stations and three decision points have been shown in the paths shown in FIG. 1, the guidance system disclosed herein is intended for use with systems having a large number of stations and decision points. For example, as will be apparent hereinafter, the system disclosed herein can be utilized with up to 99 decision points and 29 stations. As shown in FIG. 5, the floor code signal is determined by positioning permanent magnets in one of eight positions as shown in FIG. 5. These eight positions can be interrelated as shown in the tables in FIGS. 6 and 7 to represent 99 decision points and 29 stations. As the vehicle passes over a decision point or station, the reader devices on the bars 34, 35 simultaneously read the presence or absence of the permanent magnets to produce a binary coded signal.

Figure 4:
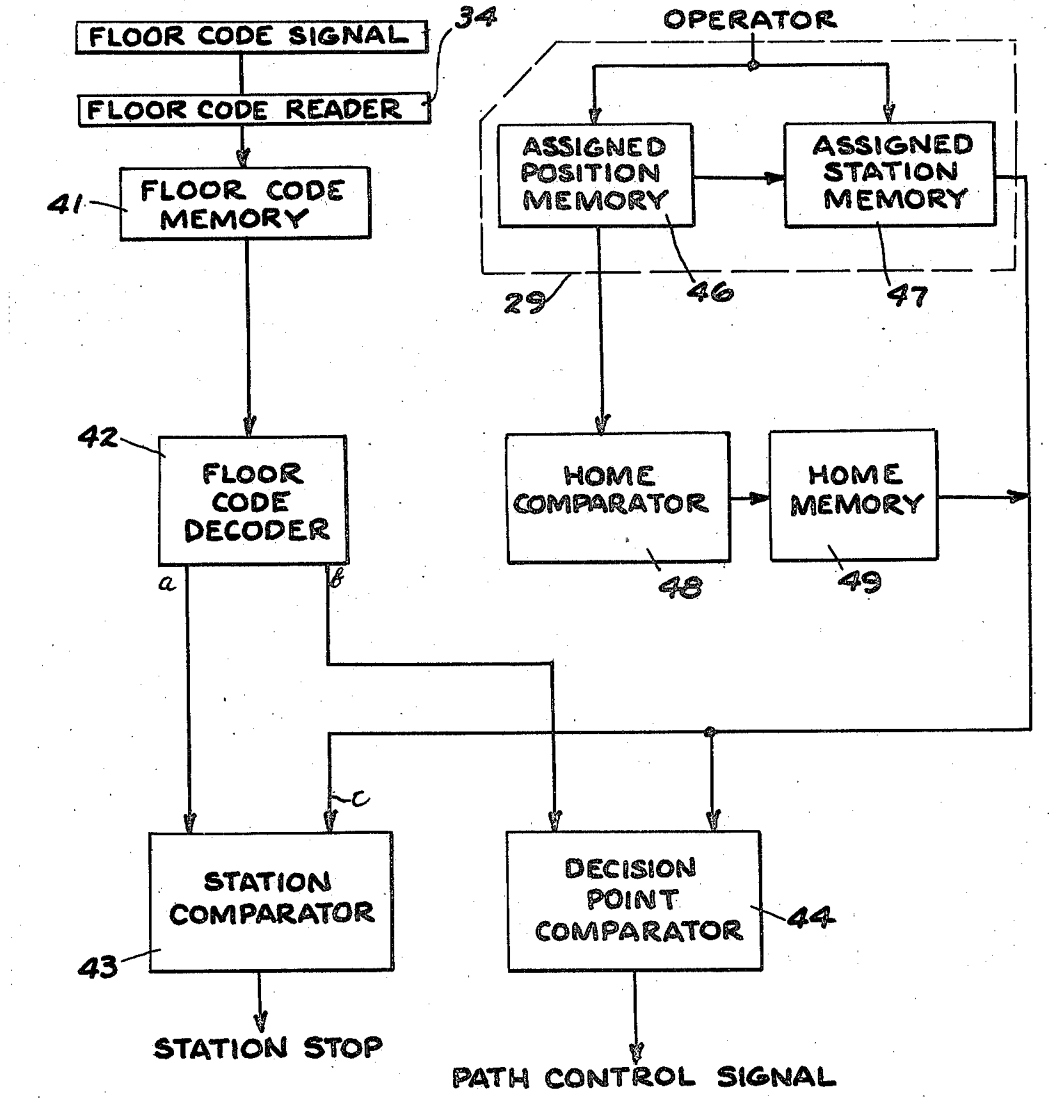
FIG. 4 is a schematic block diagram of the guidance system.

Referring to the block diagram shown in FIG. 4, the guidance system disclosed herein is intended to produce two signals, one for stopping the vehicle at the desired predetermined station and the other for producing a path control signal to insure that the vehicle will make the appropriate decisions at decision points such as points where the vehicle has diverging paths in order that the vehicle will take a preferred route to the predetermined station.

Referring to FIG. 4, the operator selects one or more stations by manipulating selector panel 29 on the vehicle. The vehicle has, as previously set forth, reader means 34, 35 thereon which read a signal along the floor. At each station and decision point along the floor, the position of the magnets is read by appropriate reader devices on the bars 34, 35, such as coils or reed switches on the vehicle, to produce a binary coded signal. The binary coded signal at any station or decision point is directed to a floor code memory device 41, which stores the signal, and thereafter to a floor code decoder 42 that converts the binary signal to a decimal signal which is either a station number (*a*) or a decision point number (*b*).

In the event the coded signal is a station point, the decimal number (*a*) is then directed to a station comparator 43 which also receives a station signal (*c*) from the control panel 29. If the station number (*a*) being read is the same as the assigned station number (*c*) from the station selector panel 29, a stop signal is produced to stop the vehicle.

In the event the code being sensed is a decision point, a decision point comparator 44, which is more fully described hereinafter, compares the decision point number (*b*) of the vehicle with the assigned station number (*c*) to which the vehicle is being directed and produces an appropriate path control signal for guiding the vehicle in a predetermined path, usually the shortest path to the assigned station.

As further shown in FIG. 4, the system preferably includes station selector panel 29 in which a plurality of stations can be selected for successive movement of the vehicle thereto. Accordingly, the system includes an assigned position memory 46, herein described as having five positions, which is sequenced by a timing circuit to successively interconnect each of the stations that have been selected in the panel 29 to the guidance system so that the vehicle will have one destination at a time. As further shown in FIG. 4, the system includes a home memory 49 and a home comparator 48 which are operable after the vehicle has passed to each of the assigned positions to return the vehicle to a home station.

In the schematic diagrams used herein, logic symbols have been used in accordance with the publication of the American Institute of Electronics Engineers titled Graphic Symbols For Logic Diagrams No. 91.

FLOOR CODE MEMORY

Figure 8:
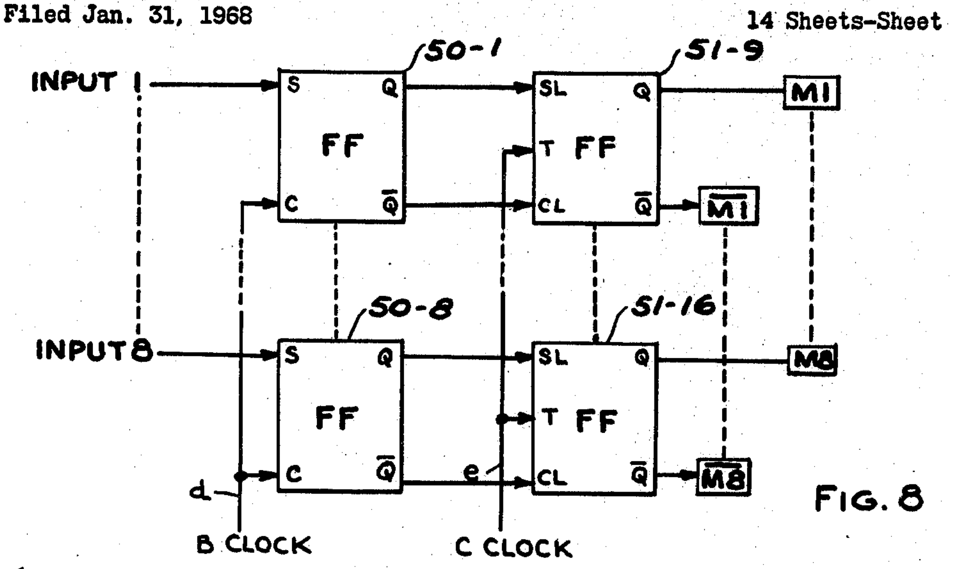
FIG. 8 is a schematic diagram of the floor code memory.
Figure 9:
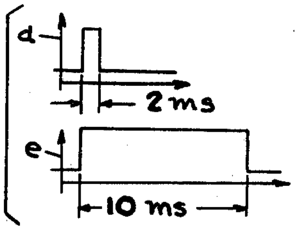
FIG. 9 is a pulse-time diagram in the floor code memory.

FIG. 8 is a schematic diagram of the floor code memory 41. Each input (1 through 8) corresponds to a bit position of the 8-bit floor code. As the vehicle or tractor passes over the floor code, the floor code reader 34, 35 reproduces the floor code at the inputs of the first flip-flops 50–1 through 50–8. During the time that the tractor is over the magnets, the B clock pulse (*d*) clears the first flip-flops for a predetermined time interval such as 2 milliseconds. After the B clock pulse turns OFF, the inputs 1 through 8 which are ON will turn the corresponding first flip-flops 50 ON. At the end of a longer predetermined time interval such as 10 milliseconds, the ON to OFF transition of the C clock (*e*) triggers the second flip-flops 51–9 through 51–16 and those second flip-flops 51 will turn ON which have their corresponding first flip-flops 50 ON. Thus, 10 milliseconds after receiving the floor code signals, the floor code pattern is stored in flip-flops 51–9 through 51–16. This code is retained in the memory 41 until the tractor passes over a new floor code. The relationship of the time intervals is shown in the pulse-time diagrams in FIG. 9.

Figure 10:
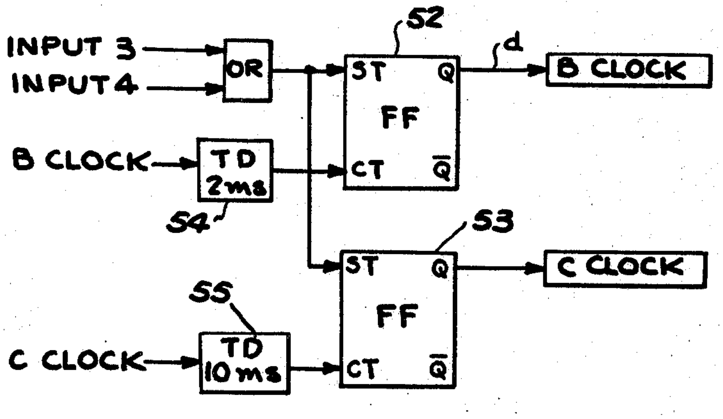
FIG. 10 is a schematic diagram of the clock circuit which is associated with the floor code memory.
Figure 11:
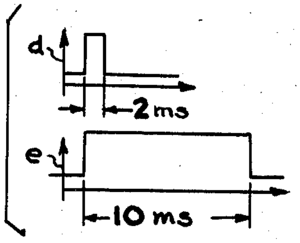
FIG. 11 is a pulse-time diagram of the clock circuit shown in FIG. 10.

FIG. 10 shows the clock circuit associated with the floor code memory. All input floor codes for station numbers or decision numbers contain a bit in specific positions such as either the third or fourth (or both) positions. Thus, as the tractor passes over the floor code, either input 3 or input 4 will set flip-flops 52 and 53. Flip-flop 53 generates the C clock pulse (*e*). Turning on flip-flop 52 activates time delay 54 which generates a pulse after 2 milliseconds and clears flip-flop 52. Turning ON flip-flop 53 activates time delay 55 which generates a pulse after 10 milliseconds and clears flip-flop 53. FIG. 11 shows the pulse-time relationships for the clock circuit.

FLOOR CODE DECODER

The floor code decoder 42 comprises a unit digits memory decoder, a station tens digit memory decoder, and a decision point tens digit memory decoder.

FIG. 12 shows a typical units digit memory decoder 56 comprising a four-input AND gate used for decoding the first four floor code bits from the memory. FIG. 13 is a table for the ten different units digits and their associated codes. The inputs 1 through 4 are connected to the memory bits M1 through M4 according to the pattern of 1's and 0's as shown. For example, the AND decoder gate for the units digit 9 would be connected as follows: 1 to M1, 2 to $\overline{\mathbf{M2}}$, 3 to M3 and 4 to M4. Thus, there will be ten AND gates, one for each units digit.

FIG. 14 shows a typical station tens digit memory decoder 57 comprising a four input AND gate used for decoding the second four floor code bits from the memory. FIG. 15 is a table for the ten different station tens digits and their associated codes. The inputs 5 through 8 are connected to the memory bits M5 through M8 according to the pattern of 1's and 0's as shown. There are ten AND gates, one for each of the ten station tens digit.

FIG. 16 shows a typical decision point tens digit memory decoder 58 comprising a four input AND gate used for decoding the second four floor code bits from the memory. FIG. 17 is a table for the three different tens digits and their associated codes. The inputs 5 through 8 are also connected to the memory bits M5 through M8 according to the pattern of 1's and 0's as shown. There are three AND gates, one for each of the ten decision point tens digits.

Thus, the station tens digit memory decoder 57 and units memory decoder 56 combine to produce a decimal signal in the event that the floor code being read is a station. The decision point tens digit memory decoder 58 and units digit memory decoder 56 cooperate to produce a decimal signal if the floor code being read is a decision point.

STATION COMPARATOR

The station comparator 43 comprises a station units digit comparator, a station tens digit comparator and a station stop circuit.

Figure 18:
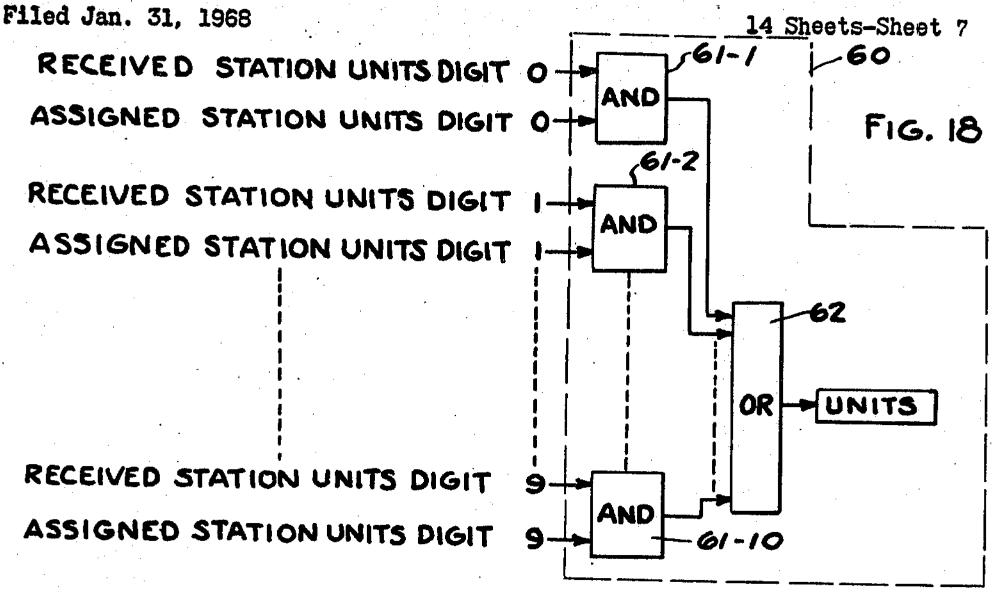
FIG. 18 is a schematic diagram of the station units digit comparator.

FIG. 18 shows the station units digit comparator 60 which comprises a plurality of AND gates 61–1 through 61–10. Each AND gate 61 compares a received station units digit with an assigned station units digit. The outputs of the gates 61 are connected to an OR gate 62. The received station's units digits 0 through 9 are each compared to the corresponding assigned station units digit 0 through 9. If the assigned station's units digits and the received station units digit are the same, then one of the ten pairs are identical, and the OR gate will turn the units signal ON.

Figure 19:
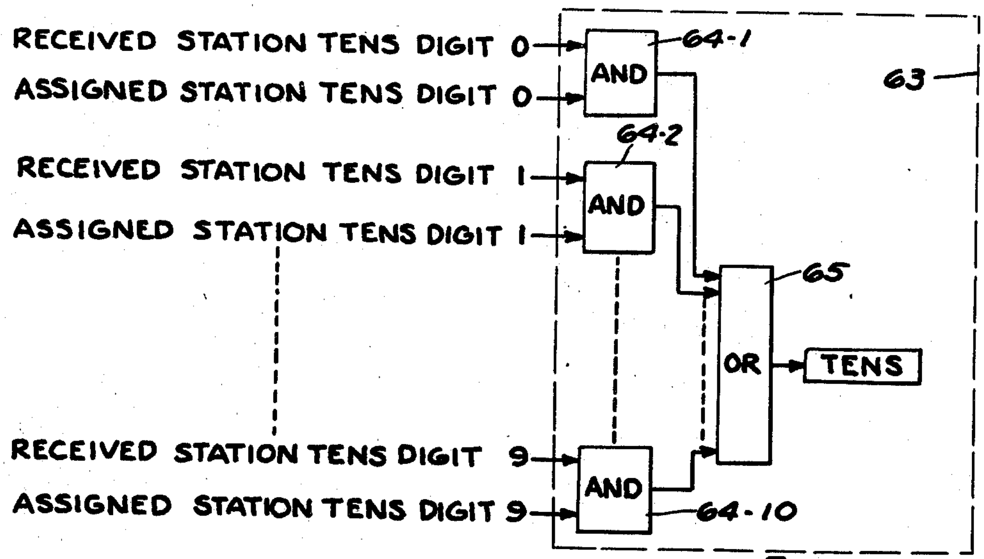
FIG. 19 is a schematic diagram of the station tens digit comparator.

FIG. 19 shows the station tens digit comparator 63 which comprises a plurality of AND gates 64–1 through 64–10. Each AND gate compares a received station tens digit with an assigned station tens digit. The outputs of the AND gates 64 are directed to an OR gate 65. The received station's tens digits 0 through 9 are each compared to the corresponding assigned station's tens digit 0 through 9. When one of the ten pairs are identical, then the OR gate 65 will turn the tens signal ON.

Figure 20:
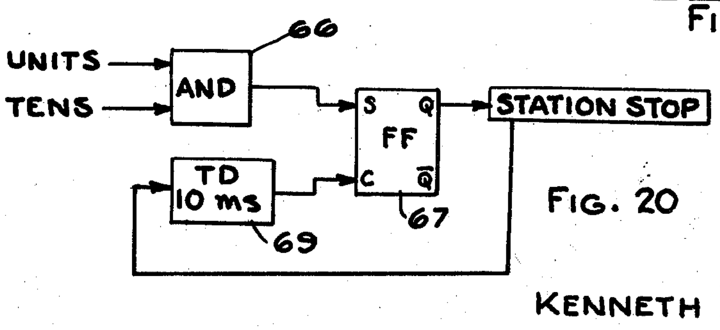
FIG. 20 is a schematic diagram of the station stop circuit.

FIG. 20 shows the station stop circuit which comprises an AND gate 66 to which the units signal and tens signal from the station units digit comparator 60 and station tens digit comparator 63 are directed. When the assigned station and the received station are identical, the units signal and the tens signal will both be on and the AND gate will set a flip-flop 67, turning the station stop signal ON. The station stop signal ON activates a time delay generator 69 which generates a pulse after 10 milliseconds to clear the flip-flop 67 and turn the station stop signal OFF. Thus, the station stop signal is a 10 millisecond pulse.

DECISION POINT COMPARATOR

Figures 21, 22:
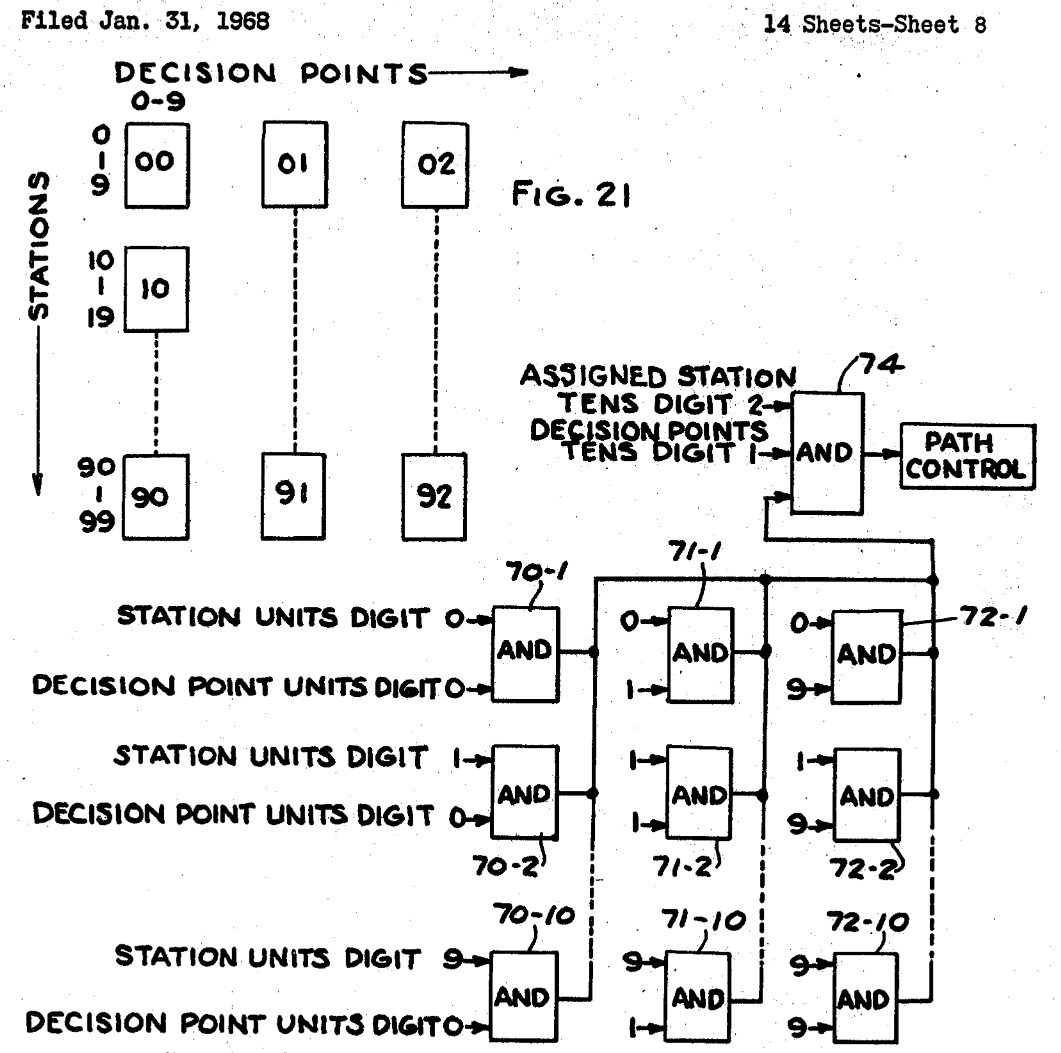
FIG. 21 is a schematic diagram of the matrix or array for the decision point comparator.
FIG. 22 is a schematic diagram of one of the matrix groups utilized in the decision point comparator shown in FIG. 21.

FIG. 21 is a simplified diagram of the matrix or array for the decision point comparator 44. In the system described, there are 99 possible stations (1 through 99) and 29 possible decision points (1 through 29). The decision point comparator 44 must contain the required circuitry to compare each decision point with every assigned station (a total of 2871 comparisons) to direct the path of the tractor. To simplify the construction of this large comparator, the matrix is divided into groups, where each will compare ten stations with ten decision points. As seen in FIG. 21, there are 10 groups for the first ten decision points, 10 groups for the second ten decision points, and 10 groups for the third ten decision points. Thus, there will be thirty groups for a system containing all 99 stations and all 29 decision points.

Further, each group is identified by a two-digit number called the major matrix number. The major matrix number consists of the stations tens digit first and the decision point tens digit second. Thus, the group with the major matrix number of 92 will be comparing stations 90 through 99 with decision points 20 through 29.

FIG. 22 is a schematic diagram of one matrix group of the thirty groups shown in FIG. 21 and is referred to as a minor matrix. Each minor matrix compares the ten station units digits with the ten decision point units digits, or a total of 100 comparisons by the use of AND gates. The first vertical column of AND gates 70–1 through 70–9 compares the decision point's 0 units digit with each of the station's units digits 0 through 9. The next vertical column of AND gates 71–1 through 71–9 compares the decision points 1 units digit with the station units digits 0 through 9. The remaining vertical columns of AND gates 72–1 through 72–9 and so forth are compared in like manner to the station units digit 0 through 9. For purposes of clarity, only part of the AND gates are shown. In each minor matrix, the outputs of all the AND gates as well as the station tens digit signal and the decision point tens digit signal are directed to an AND gate 74. The outputs of all 100 AND gates are tied together so that the compared output will be ON if any one of the 100 AND gates is ON. This output signal is connected to the third input of AND gate 74. The other two inputs to AND gate 74 are from station tens digit and the decision point tens digit that corresponds to the major matrix number that this group represents. Thus, if this minor matrix represents the group 21, then the assigned station's tens digit 2 signal is connected to the first input of the AND gate 74, and the decision point's tens digit 1 signal is connected to the second input of the AND gate 74. Thus, the assigned station number must fall between 20 and 29 and the decision point must be between 10 and 19 for the AND gate 74 to be ON.

However, when AND gate 74 is ON, the tractor will generate an ON path control signal which will result in the tractor following the desired guide path corresponding with the ON signal. If it is desired to switch the tractor in the direction corresponding with the OFF signal, then the steer signal must be OFF when the comparison is made. To accomplish an OFF signal for a desired comparison, I merely remove the AND gate in the minor matrix which is making that particular comparison. For example, suppose that in the system design it is determined that the tractor must switch left at decision point II to arrive at station 29 which corresponds to station C in FIG. 1, and that a path control signal OFF will cause the guide path to switch left. Previously it was determined that the group with the major matrix number of 21 would include station number 29 and decision point II. In addition, it can be seen that the AND gate 71–10 is comparing station 29's units digit and decision point II's units digit. Therefore by removing this AND gate 71–10, the output path control signal from AND gate 74 will be OFF when station 21 and decision point II are compared.

Figure 24:
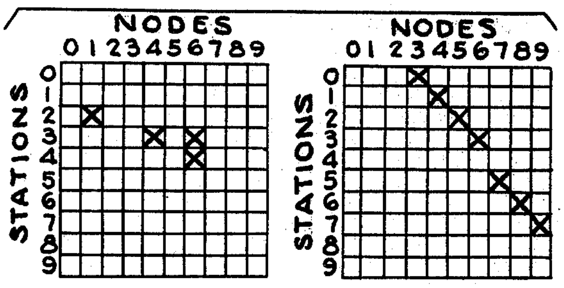
FIG. 24 are schematic diagrams of the matrix boards utilized in the system.

When a guidance system is designed for a particular installation, the relation between all station stops and all switching points (decision points) are established. Once these points are established, a table is made which lists every station stop vertically, and every decision point horizontally. As shown in FIG. 24, for every comparison of station number and decision point number that requires a path control signal ON, an X is made at the appropriate intersection, and for every comparison of station number and decision point number that requires a path control signal OFF, the intersection is left blank. This table is then used to assemble the tractor's matrix, and for each comparison point on the table that contains an X, an AND gate is inserted in the corresponding location of the appropriate group. Thus, when all the groups are assembled in the tractor, they will contain all the required gates to select the desire path control signals as required for the particular installation. It should be noted that the major and minor matrix are desired for a particular installation and can not be used in other installations without changing the matrix. Also, every tractor for a given installation will contain identical matrices.

Figure 25:
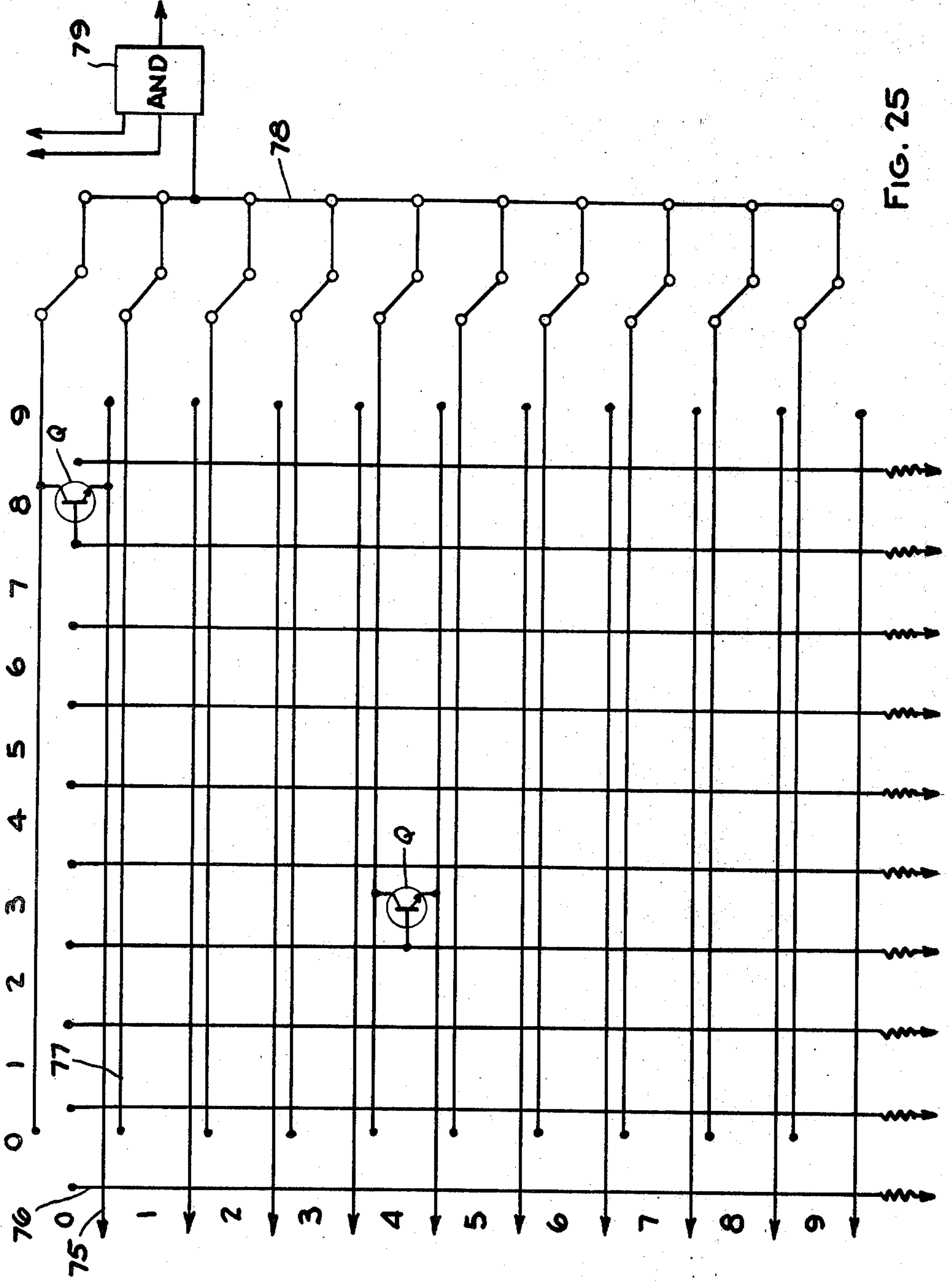
FIG. 25 is a wiring diagram of a matrix board utilized in the system.

In practice, the unique minor matrix shown in FIG. 22 is placed upon a matrix board which is shown diagrammatically in FIG. 25. Thus, in the major matrix system shown in FIG. 21 comprising 30 minor matrices. there would be in practice 30 matrix boards.

Each matrix board comprises a first set of input conductors 75, a second set of transversely extending input conductors 76 and a set of spaced output conductors 77. Input conductors 75 are adapted to be connected to receive a station unit signal from the station selector means and input conductors 76 are connected to receive a route or decision point unit signal from the decoder 42. Depending upon the path which is to be followed by the vehicle at any particular decision point, a transistor Q, corresponding to the X positions in FIG. 24 or, in other words, the particular AND gates in FIG. 22, is connected at the appropriate position across one of the conductors 75 and 76. If the appropriate signals are present at the conductors 75 and 76, an output signal will be produced along a conductor 77. The conductors 77 are connected to a common conductor 78 which passes to an AND gate 79, corresponding to AND gate 74 in FIG. 22. AND gate 79 is also connected to receive a station tens digit signal and decision tens digit signal from the assigned station memory 47 and decoder 42, respectively. If all three signals are present simultaneously at the AND gate 79, an appropriate path control signal is provided for guiding the vehicle.

It can be appreciated, for example, at a diverging point, the path control signal may comprise a positive or negative signal determining, for example, whether the vehicle is to go along the right or the left path. Depending upon the type of path control system used, this path signal can be utilized to selectively energize one of the paths, control the steering of the vehicle, or otherwise control the movement of the vehicle.

The number of transistor matrix boards that is used will depend upon the number of decision points and stations and can be determined by the following formula:

$$M=[A][B]=\left[\frac{S+1}{x}\right]\left[\frac{N+1}{y}\right]$$

$$A=\left[\frac{S+1}{x}\right] \quad B=\left[\frac{N+1}{y}\right]$$

wherein M=the number of matrix boards, S=the number of stations, N=the number of decision points, $x$=the number of station conductors per board, $y$=the number of decision point conductors per board. The factors A and B are rounded off to the next highest integer before they are multiplied to determne the number of boards.

The factor (+1) in the above formula is added where it is determined that it is not desirable to use the count 0, 0 for a station or decision point. It has been found that the factors $x$ and $y$ are preferably 10 in order to obtain the most efficient use of the digital decimal signals from the decoder and from the station selector means.

Figure 23:
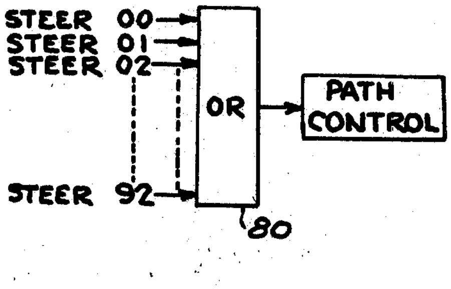
FIG. 23 is a schematic diagram of the summation of the matrices shown in FIG. 22 to produce a path control signal.

FIG. 23 shows the path control circuit. The outputs from the 30 minor matrix boards are summed at this point by an OR gate 80 so that if any one of the 30 path control signals is ON, the path control signal will go ON.

ASSIGNED STATION MEMORY

Figure 26:
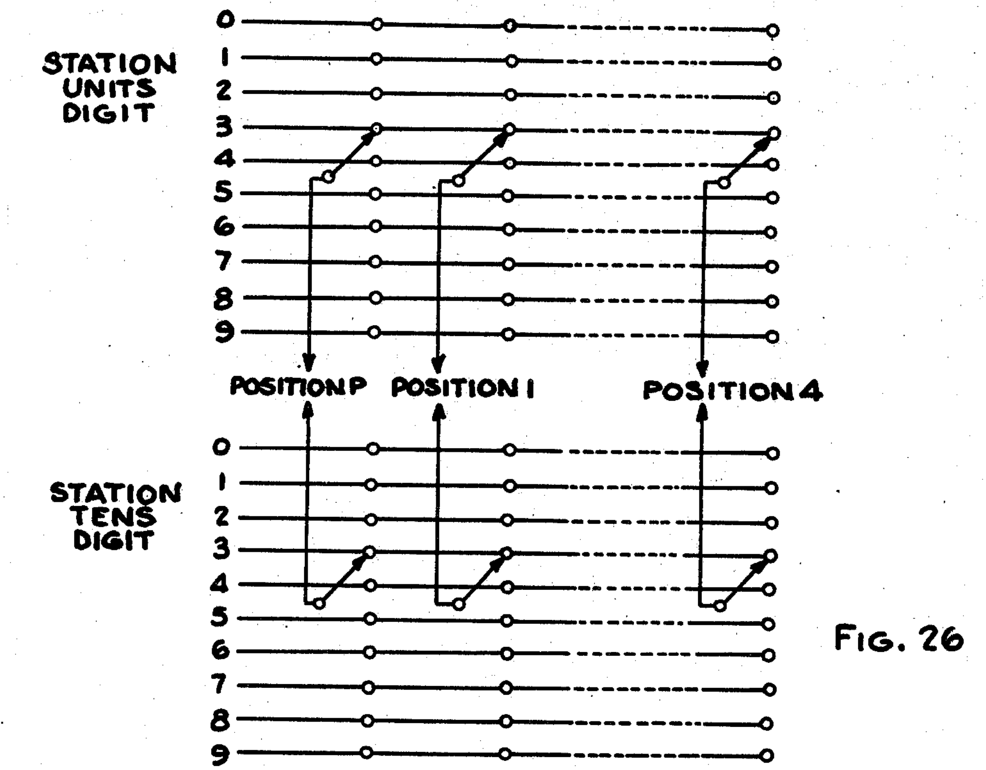
FIG. 26 is a schematic wiring diagram of the assigned station memory.

As previously set forth, the control panel 29 on the tractor comprises an assigned station memory 47 which includes a plurality of switches. Each switch can be set to an assigned station to which the vehicle is to be directed. The assigned station memory 47 is shown diagrammatically in FIG. 26 as comprising five sets of thumbwheel switches. Each set consists of a ten-position units digit switch and a ten-position tens digit switch. Thus, any station from 01 to 99 can be assigned to each set. The ten contacts of each of the unit switches are connected in parallel as are the ten contacts of each of the tens switches. Thus, whenever the priority position is activated, an ON position P signal is present at the arm of each of the switches in the priority set, and the setting of these switches determines the number of the assigned station. When the proirity position is de-activated, the position P signal goes OFF, and the switch arms no longer influence the assigned station, regardless of their setting. In like manner, the arms of the position switches 1 through 4 are connected to the position decoders 1 through 4, and whichever position is activated by the position counter will determine the tractor's station memory.

ASSIGNED POSITION MEMORY

Figure 27:
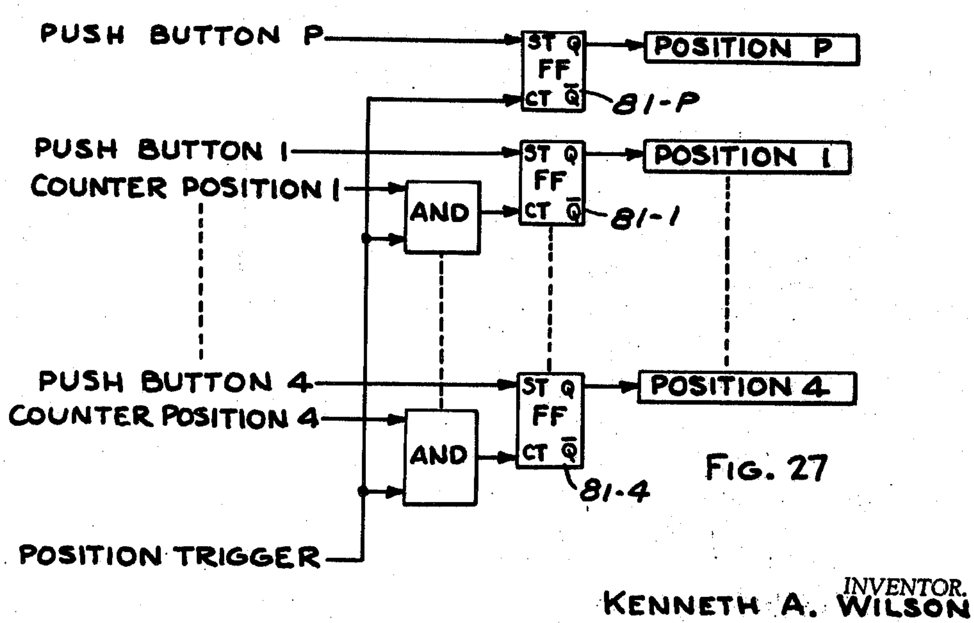
FIG. 27 is a schematic diagram of the assigned position memory.

FIG. 27 is a schematic diagram of the assigned position memory. There is a position memory flip-flop 81–1, 81–2, 81–3, 81–4 and 81–P for each of the five station assignment positions in the assigned station memory (positions 1, 2, 3, 4 and priority). Momentarily depressing a positon pushbutton on the control panel will set the corresponding flip-flop and turn ON the associated position signal. Any or all of the positions may be activated as the operator requires. When the position trigger turns ON, it will turn OFF the priority flip-flop or the position that corresponds with the position of the position counter.

FIG. 28 is a schematic diagram of the position counter. Items 82 through 86 are the logic elements for the 9-position counter. FIG. 29 is a table showing the different states of the logic elements 82 through 85 for successive input triggers. Following down the table, the first trigger sets flip-flop 82 ON. The second trigger sets flip-flop 82 OFF which sets flip-flop 83 ON, etc. On the eighth trigger, flip-flops 82, 83, and 84 are set OFF. As flip-flop 84 turns OFF, a pulse is generated from a pulse circuit 86 which sets flip-flop 85 ON. When flip-flop 85 is ON, the $\overline{Q}$ signal inhibits flip-flop 82 from being triggered by the next input trigger. Also, the Q output signal allows the flip-flop 85 to be cleared by the next input trigger. Consequently, the ninth input trigger clears flip-flop 85 only, and the flip-flops 81 through 85 are now all OFF. The tenth input trigger will produce the same pattern as the first input trigger and the count cycle will repeat in the same sequence.

FIG. 30 shows the position counter decoder comprising a typical AND decoder gate 87 used for decoding the four output bits (B1 through B4) from the position counter. FIG. 31 is a table for the four different positions and their associated codes. The inputs *a* through *d* are connected to the position counter B1 through B4 according to the pattern of 1's and 0's as shown. There are four gates, one for each position. The counter has nine count positions whereas only four station assignment positions are used on the control panel (not including the priority position). The remaining positions of the counter are not used. A 2-input NOR gate 88 is provided and has an output common to the fifth input of each of the four decoder gates. When there is either a home signal, as presently described, or a position priority signal, then there is an OFF signal out of NOR gate 88 which turns OFF the output signals from all four decoder gates. Thus, there will be no position signals from position 1 through 4 whenever there is either a home signal or a position priority signal.

FIG. 32 shows the trigger circuit. The output position trigger 90 is used to reset the position memory flip-flops and an output counter trigger 91 is used to sequence the counter. When the tractor comes to a station stop, or if the skip signal is ON, the OR gate 92 will set the flip-flop ON, which generates an ON position trigger 90. If the position priority is OFF, then the AND gate 93 will generate a counter trigger ON. The flip-flop ON activates the time delay 94 which generates a pulse after 10 milliseconds which clears the flip-flop and turns the triggers OFF.

Figure 33:
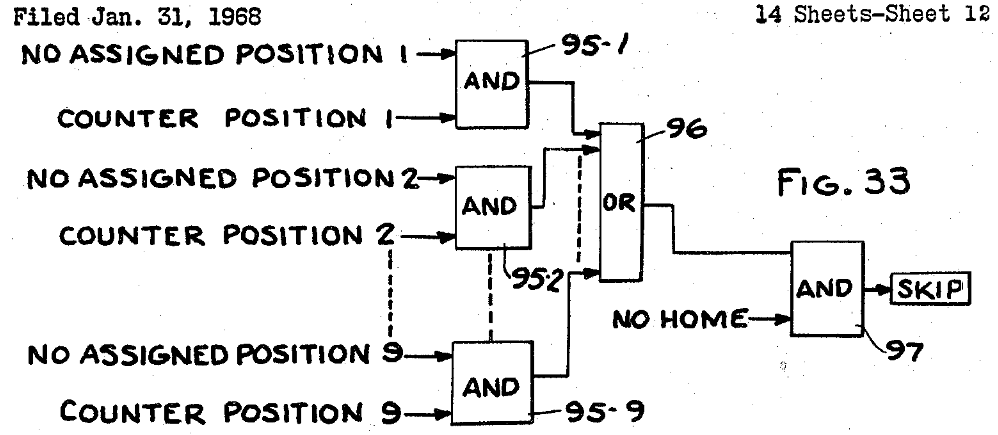
FIG. 33 is a schematic diagram of the skip comparator.

FIG. 33 shows the skip comparator. Each counter position is compared with the corresponding assigned position flip-flop 95–1 through 95–9 so that if the counter number corresponds to an assigned position that is OFF, a skip signal will be generated through OR gate 96 and AND gate 97. If, however, the home signal is ON, then the AND gate 97 is inhibited from generating a skip signal.

HOME STATION MEMORY

Figure 34:
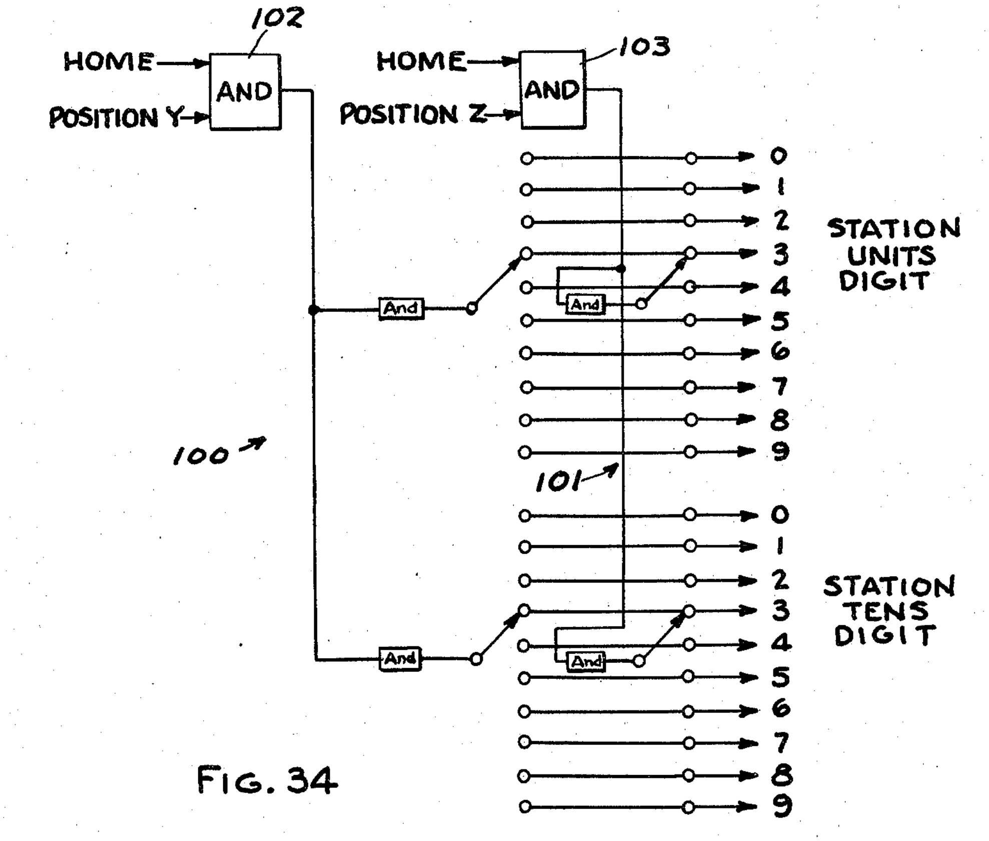
FIG. 34 is a schematic diagram of the home station memory.

The home station memory 49 is shown schematically in FIG. 34. There are two sets of some switches 100, 101 located on printed circuit cards. Each set is identical in function to the assigned station memory switches. The switch arms, however, are in the form of a wire jumper on the printed circuit board so that the home switch positions are set by inserting the appropriate jumper. These switches are set at the factory and are not changed once installed. A two-input AND gate 102, 103 is associated with each set of switches. When the home signal is activated ON, and if the home selector switch on the unique control panel is in the Y position, the output of the AND gate 102 will be ON, and the set of Y switches will determine the station assignment. (This is home Y.) If the home selector switch is in the Z position, however, and the home signal is activated, then the output of AND gate 103 will be ON and the set of Z switches will determine the station assignment. (This is home Z.)

Figure 35:
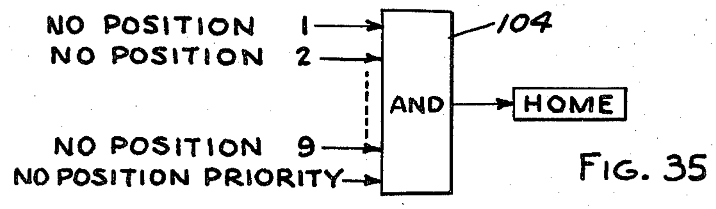
FIG. 35 is a schematic diagram of the home circuit comparator.

FIG. 35 is a schematic diagram of the home comparator. If positions 1 through 9 are OFF and position priority is OFF, then the AND gate 104 will generate a home signal.

OPERATION OF SEQUENCING CIRCUITS

When all the station assignments have been completed as selected on the assigned station memory 47 (FIG. 26), then all the assigned positions and associated lights in the assigned position memory 46 (FIG. 27) will be OFF. With all positions OFF, AND gate 104 of the home comparator (FIG. 35) will now generate a home signal. This home signal will now determine the tractor's new station assignment. However, if a position on the assigned position memory 46 (FIG. 27) is activated, one of the inputs to AND gate 104 will cause the home signal to turn OFF. When the home signal is turned OFF, the sequencing circuit will sequence the counter 28 (FIG. 29) to match the assigned position.

For example, say that the counter (FIG. 28) is at position 2 and position 1 is activated. AND gate 87 (FIG. 30) will now generate a signal indicating that the counter is at position 2. The skip comparator (FIG. 33) will generate a skip pulse as the counter and position memory numbers do not match. This skip pulse through OR gate 92 (FIG. 32) steps the counter to a new position. The skip comparator (FIG. 32) will continue to step the counter in sequence until the counter and position memory numbers match. Since position 1 is activated, the counter will stop when its position number is 1. The output of the counter now activates the station switches at position 1 and the station assigned to position 1 now becomes the tractor's new destination.

When the tractor stops at the position 1 station, the station stop signal generates a trigger (FIG. 20). Since the counter is in position 1, the comparator will allow the trigger to turn the memory position 1 OFF (FIG. 27). The trailing edge of the trigger then steps the counter to position 2 (FIG. 28). As there are no positions ON now, AND gate 104 (FIG. 35) turns the home signal ON and inhibits the generation of skip pulses.

If position P is activated, AND gate 87 (FIG. 30) is inhibited from generating any counter position signals, AND gate 104 (FIG. 35) is inhibited from generating the home signal, and the skip comporator (FIG. 35) is inhibited from generating any skip pulses. When the tractor arrives at the priority station, the station stop signal generates a position trigger (FIG. 32) which turns off the position P memory (FIG. 27), and AND gate 93 (FIG. 32) inhibits the position trigger from generating a counter trigger to step the counter.

FUNCTION COMPARATORS

Figure 36:
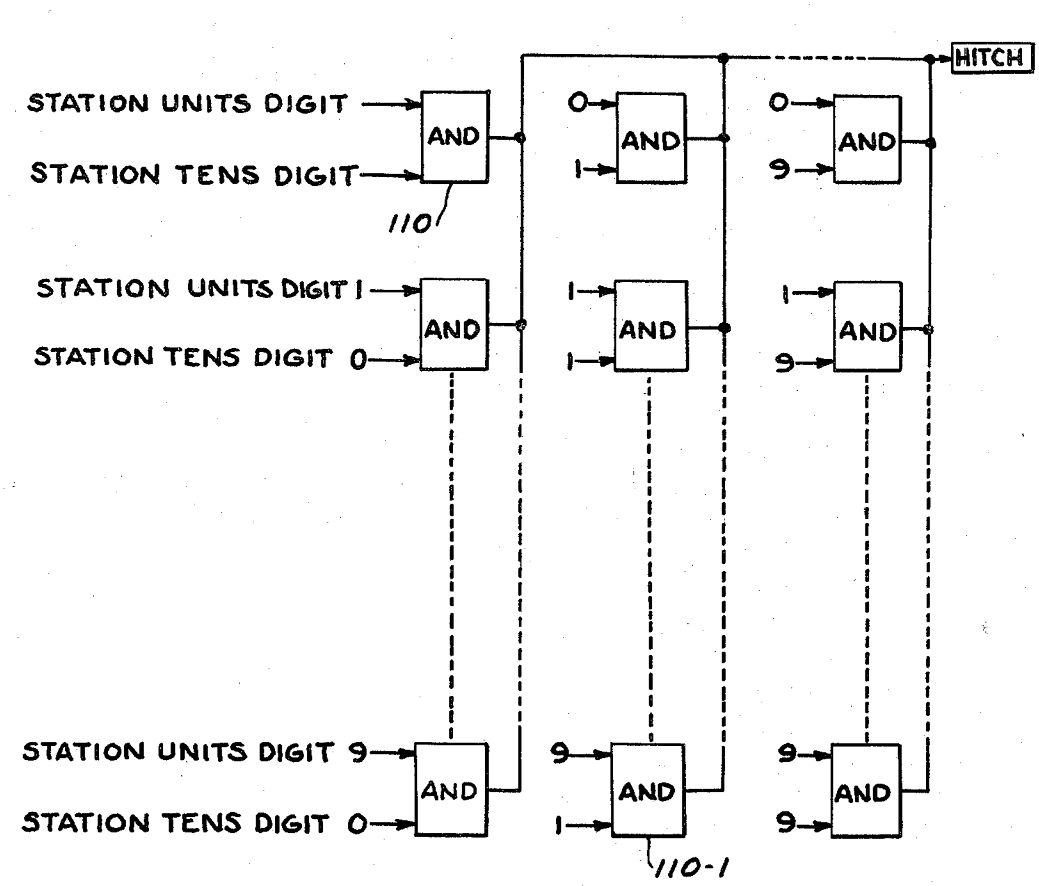
FIG. 36 is a schematic wiring diagram of a hitch operating circuit.

The system may also have circuitry associated therewith for performing some function on the vehicle at predetermined locations such as the operation of a hitch on the tractor. As shown in FIG. 36, a comparator is provided which may be in the form of a matrix board that contains a pre-selected program which determines at which station stops the trailers will be automatically uncoupled, and turns the hitch signal ON or OFF as required for each station destination. As shown, the hitch diagram comprises an array of AND gates 110 corresponding to the number of stations at which the hitch is to be operated. Each AND gate is connected in a manner to operate the hitch when the required station units digit and station tens digit passes through that AND gate.

The hitch circuit shown in FIG. 36 compares the received station's ten digit and the received station's units digit. The hitch matrix only gates a station number. The first vertical column of AND gates compares the assigned numbers station tens digit 0 and the assigned station units digits 0 through 9. The next vertical column of AND gates compares the assigned station numbers tens digit 1 and the assigned station units digits 0 through 9. The remaining vertical columns of AND gates are compared in like manner to the station units digits 0 through 9. Thus, AND gate 110–1 represents station 19. The outputs of all 100 AND gates are tied together so that the compared output will be ON if any one of the 100 AND gates is ON. When the hitch signal is ON, and the tractor comes to a station stop, the hitch will automatically uncouple the tractor from the trailers.

When a guidance system is designed for a particular installation, those stations which are hitch stations are so designated. Once the hitch stations are established, the hitch matrix card is assembled, and an AND gate is inserted at each station number intersection designated as a hitch station. Thus, when the card is completed, it will contain all the required gates to select the desired hitch stations as required for the particular installation.

HORN CIRCUIT

Figure 37:
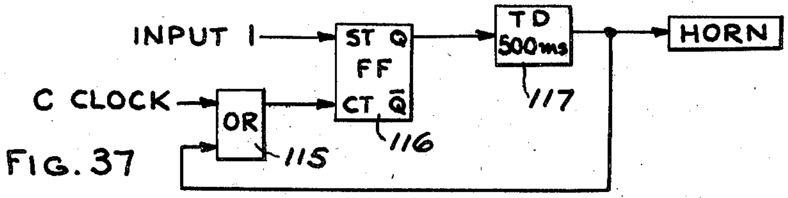
FIG. 37 is a schematic diagram of a horn operating circuit.

The system also incorporates a circuit for operating the horn signal at desired points along the guide path. FIG. 37 is a schematic diagram of the horn circuit which comprises an OR gate 115, flip-flop 116 and a time delay 117. The floor code for the horn signal is a single magnet in position 1 of the floor code. When the floor code reader magnet passes over the horn floor code, input 1 turns the flip-flop 116 ON. Turning the flip-flop 116 ON activates the time delay 117 which generates a horn pulse after 500 milliseconds. This pulse also shuts off the flip-flop 116 through the OR gate 115. The flip-flop 116 will also be turned on by a station number code or decision point code that contains a bit in the first position. However, in these cases, the C clock pulse resets the horn circuit flip-flop immediately, de-activating the time delay 117. Thus, a horn signal will be generated only when the tractor passes over a horn code.

SCHEMATIC SYMBOLS

Although the various schematics and symbols utilized in the above description are conventional, for purposes of clarity, the various flip-flops utilized are shown in FIGS. 38, 40 and 42 and the associated input and output functions are shown in the tables in FIGS. 39, 41 and 43, respectively. In these tables, the terms utilized are as follows:

P=a positive going transition (0–1)
N=a negative going transition (1–0)
Q=the active output of a two state device
$n$=time before the trigger pulse transition
$n+1$=time after the trigger pulse transition
*=indeterminate
≡=is equivalent to

I claim:

1. In a guidance system, the combination comprising
means defining a guide path,
a vehicle having sensing means thereon for sensing said path and guiding the vehicle along said path,
said path including a plurality of stations therealong and a plurality of decision points therealong,
said decision points defining areas of angularly related paths along which the vehicle may move,
individual floor code signal means at each of said stations and decision points,
reader means on the vehicle for simultaneously reading said code signal means,
said reader means and said code signal means producing a binary signal,
a floor code decoder on said vehicle for converting said binary signal to a received decimal number corresponding to the station or the decision point,
assigned station means on the vehicle for assigning a station number to which the vehicle is to be directed,
means on the vehicle for comparing the received station number and the assigned station number and stopping the vehicle if they are identical,
means on the vehicle for comparing the assigned station number with the decision point number,
said last-mentioned means including a program operable to produce a path control signal for guiding the vehicle in a predetermined path in response to the comparison of the assigned station number and the decision point number.

2. The combination set forth in claim 1 wherein said last-mentioned means comprises a major matrix comprising a plurality of minor matrices,
each said minor matrix including means for comparing a plurality of assigned stations with a plurality of decision points to produce a path control signal for each decision point compared.

3. The combination set forth in claim 2 wherein each said group comprises a plurality of selectively positionable AND gates, the outputs of said AND gates being connected to a further AND gate, said first-mentioned AND gates having received decision point units digits signal and assigned station units digits signal applied thereto, said last-mentioned AND gate having the output of said first-mentioned AND gates and a received station tens digit signal and decision point tens digit signal applied thereto.

4. The combination set forth in claim 1 wherein said last-mentioned means comprises
a plurality of matrix boards,
each board comprising
a first set of spaced input conductors connected to receive received decision point units digits,
a second set of spaced input conductors extending transversely of said first set connected to receive assigned station units digits from said assigned station means,
a set of spaced output conductors,
and an AND gate connected to one of said first set and one of said second sets of input conductors and one of said sets of output conductors at a point corresponding to a decision point wherein a program decision is to be made, one of said first and second sets of input conductors receiving a decision point units signal from said decoder, the other of said first and second set of input conductors receiving a station units signal from the station selector means, each said board having an AND gate connected to the common output conductors, said last-mentioned AND gate receiving a received decision point tens digit signal from said decoder and an assigned station tens digit signal from said assigned station means such that at any particular decision point said programming means will produce an appropriate path control signal for guiding the vehicle along the predetermined path toward the selected station.

5. The combination set forth in claim 4 wherein said sets of input and output conductors are in multiples of ten on each said matrix board.

6. The combination set forth in claim 4 wherein the number of matrix boards is determined by the formula $$M=[A][B]=\left[\frac{S}{x}\right]\left[\frac{N}{y}\right]$$

$$A=\frac{S}{x} \qquad B=\frac{N}{y}$$

wherein M=the number of matrix boards, S=the number of stations, N=the number of decision points, $x$=the number of stations per board, $y$=the number of decision points per board and wherein A and B are rounded off to the next highest integer.

7. The combination set forth in claim 1 wherein said assigned station means comprises a plurality of successively actuated station selector means whereby the vehicle may be guided successively to different stations, and means operable upon arrival of a vehicle at one station to activate the next selected station.

8. The combination set forth in claim 1 wherein said floor code decoder comprises a plurality of AND gates including an AND gate for each said tens digit and each said units digit of said received station number or decision point number.

9. The combination set forth in claim 1 wherein said reader means includes a floor code memory operable to retain the floor code which is read.

10. The combination set forth in claim 1 including a circuit operable upon arrival of the vehicle at a predetermined station to return the vehicle to a home station.

11. The combination set forth in claim 1 including a circuit operable upon arrival of the vehicle at a predetermined station to perform a predetermined function such as lifting a hitch or blowing a horn.

12. In a guidance system, the combination comprising means defining a guide path, a vehicle having sensing means thereon for sensing said path and guiding the vehicle along said path, said path including a plurality of stations therealong and a plurality of decision points therealong, said decision points defining areas of angularly related paths along which the vehicle may move, individual floor code signal means at each of said stations and decision points comprising an array of magnets, reader means on the vehicle for simultaneously sensing the presence of magnets at any station or decision point, said reader means and said magnets producing a binary signal, a floor code decoder on said vehicle for converting said binary signal to a received decimal number corresponding to the station or the decision point, assigned station means on the vehicle for assigning a station number to which the vehicle is to be directed, means on the vehicle for comparing the received station number and the assigned station number and stopping the vehicle if they are identical, means on the vehicle for comparing the assigned station number with the decision point number, said last-mentioned means including a program operable to produce a path control signal for guiding the vehicle in a predetermined path in response to the comparison of the assigned station number and the decision point number.

13. The combination set forth in claim 12 wherein said last-mentioned means comprises a major matrix comprising a plurality of minor matrices, each said minor matrix including means for comparing a plurality of assigned stations with a plurality of decision points to produce a path control signal for each decision point compared.

14. The combination set forth in claim 13 wherein each said group comprises a plurality of selectively positionable AND gates, the outputs of said AND gates being connected to a further AND gate, said first-mentioned AND gates having received decision point units digits signal and assigned station units digits signal appled thereto, said last-mentioned AND gate having the output of said first-mentioned AND gates and a received station tens digit signal and decision point tens digit signal applied thereto.

15. The combination set forth in claim 12 wherein said last-mentioned means comprises a plurality of matrix boards, each board comprising a first set of spaced input conductors connected to receive received decision point units digits, a second set of spaced input conductors extending transversely of said first set connected to receive assigned station units digits from said assigned station means, a set of spaced output conductors, and an AND gate connected to one of said first set and one of said second set of input conductors and one of said sets of output conductors at a point corresponding to a decision point wherein a program decision is to be made, one of said first and second sets of input conductors receiving a decision point units signal from said decoder, the other of said first and second set of input conductors receiving a station units signal from the station selector means, each said board having an AND gate connected to the common output conductors, said last-mentioned AND gate receiving a received decision point tens digit signal from said decoder and an assigned station tens digit signal from said assigned station means such that at any particular decision point said programming means will produce an appropriate path control signal for guiding the vehicle long the predetermined path toward the selected station.

16. The combination set forth in claim 15 wherein said sets of input and output conductors are in multiples of ten on each said matrix board.

17. The combination set forth in claim 15 wherein the number of matrix boards is determined by the formula $$M=[A]\,[B]=\left[\frac{S}{x}\right]\left[\frac{N}{y}\right]$$

$$A=\frac{S}{x} \qquad B=\frac{N}{y}$$

wherein M=the number of matrix boards, S=the number of stations, N=the number of decision points, $x$=the number of stations per board, $y$=the number of decision points per board and wherein A and B are rounded off to the next highest integer.

18. The combination set forth in claim 12 wherein said assigned station means comprises a plurality of successively actuated station selector means whereby the vehicle may be guided successively to different stations, and means operable upon arrival of a vehicle at one station to activate the next selected station.

19. The combination set forth in claim 12 wherein said floor code decoder comprises a plurality of AND gates including an AND gate for each said tens digit and each said units digit of said received station number or decision point number.

20. The combination set forth in claim 12 wherein said reader means includes a floor code memory operable to retain the floor code which is read.

21. The combination set forth in claim 12 including a circuit operable upon arrival of the vehicle at a predetermined station to return the vehicle to a home station.

22. The combination set forth in claim 12 including a circuit operable upon arival of the vehicle at a predetermined station to perform a predetermined function such as lifting a hitch or blowing a horn.

23. In a guidance system, the combination comprising means defining a guide path, a vehicle having sensing means thereon for sensing said path and guiding the vehicle along said path, said path including a plurality of decision points therealong, said decision points defining areas of angularly related paths along which the vehicle may move, individual floor code signal means at each of said decision points, reader means on the vehicle for reading said signal means, said reader means and said signal means producing a binary signal, a floor code decoder on said vehicle for converting said binary signal to a decimal number corresponding to the decision point, assigned station means on the vehicle for assigning a station number to which the vehicle is to be directed, means on the vehicle for comparing the assigned station number with the decision point number, said last-mentioned means including a program operable to produce a path control signal for guiding the vehicle in a predetermined path in response to the comparison of the assigned station number and the decision point number.

24. The combination set forth in claim 23 wherein said last-mentioned means comprises a major matrix comprising a plurality of minor matrices, each said minor matrix including means for comparing a plurality of assigned stations with a plurality of decision points to produce a path control signal for each decision point compared.

25. The combination set forth in claim 24 wherein each said group comprises a plurality of selectively positionable AND gates, the outputs of said AND gates being connected to a further AND gate, said first-mentioned AND gates having received decision point units digits signals and assigned station units digits signals applied thereto, said last-mentioned AND gate having the common output of said first-mentioned AND gates and a received station tens digit signal and decision point tens digit signal applied thereto.

26. The combination set forth in claim 23 wherein said last-mentioned means comprises a plurality of matrix boards, each board comprising a first set of spaced input conductors connected to receive received decision point units digits, a second set of spaced input conductors extending transversely of said first set connected to receive assigned station units digits from said assigned station means, a set of spaced output conductors, and an AND gate connected to one of said first set and one of said second set of input conductors and one of said sets of output conductors at a point corresponding to a decision point wherein a program decision is to be made, one of said first and second sets of input conductors receiving a decision point units signal from said decoder, the other of said first and second set of input conductors receiving a station units signal from the station selector means, each said board having an AND gate connected to the common output conductors, said last-mentioned AND gate receiving a received decision point tens digit signal from said decoder and an assigned station tens digit signal from said assigned station means such that at any particular decision point said programming means will produce an appropriate path control signal for guiding the vehicle along the predetermined path toward the selected station.

27. The combination set forth in claim 26 wherein said sets of input and output conductors are in multiples of ten on each said matrix board.

28. The combination set forth in claim 26 wherein the number of matrix boards is determined by the formula $$M=[A][B]=\left[\frac{S}{x}\right]\left[\frac{N}{y}\right]$$

$$A=\frac{S}{x} \qquad B=\frac{N}{y}$$

wherein M=the number of matrix boards, S=the number of stations, N=the number of decision points, $x$=the number of stations per board, $y$=the number of decision points per board and wherein A and B are rounded off to the next highest integer.

29. The combination set forth in claim 23 wherein said assigned station means comprises a plurality of successively actuated station selector means whereby the vehicle may be guided successively to different stations, and means operable upon arrival of a vehicle at one station to activate the next selected station.

30. The combination set forth in claim 23 wherein said floor code decoder comprises a plurality of AND gates including an AND gate for each said tens digit and each said units digit of said decision point number.

31. The combination set forth in claim 23 wherein said reader means includes a floor code memory operable to retain the floor code which is read.

32. The combination set forth in claim 23 including a circuit operable upon arrival of the vehicle at a predetermined station to return the vehicle to a home station.

33. The combination set forth in claim 23 including a circuit operable upon arrival of the vehicle at a predetermined station to perform a predetermined function such as lifting a hitch or blowing a horn.

34. The combination set forth in claim 23 wherein said last-mentioned means comprises a plurality of matrix boards, each board comprising a first set of spaced input conductors connected to receive received decision point units digits, a second set of spaced input conductors extending transversely of said first set connected to receive assigned station units digits from said assigned station means, a set of spaced output conductors, and a transistor connected to one of said first set and one of said second set of input conductors and one of said sets of output conductors at a point corresponding to a decision point wherein a program decision is to be made, one of said first and second sets of input conductors receiving a decision point units signal from said decoder, the other of said first and second set of input conductors receiving a station units signal from the station selector means, each said board having an AND gate connected to the common output conductors, said AND gate receiving a received decision point tens digit signal from said decoder and an assigned station tens digit signal from said assigned station means such that at any particular decision point said programming mean will produce an appropriate path control signal for guiding the vehicle along the predetermined path toward the selected station.

35. The combination set forth in claim 34 wherein said sets of input and output conductors are in multiples of ten on each said matrix board.

References Cited

UNITED STATES PATENTS

| | | | |
|---|---|---|---|
| 2,847,080 | 8/1958 | Zworykin et al. | 180—98 |
| 3,147,817 | 9/1964 | De Liban | 180—98 |
| 3,245,493 | 4/1966 | Barrett | 180—98 |

A. HARRY LEVY, Primary Examiner

U.S. Cl. X.R.

104—150, 153; 180—77, 79; 214—16; 246—182; 340—258